United States Patent [19]

Soden et al.

[11] Patent Number: 4,482,622

[45] Date of Patent: Nov. 13, 1984

[54] MULTISTAGE DEPOSITION PROCESS

[75] Inventors: Philip H. Soden, Oakville; Paul S. Vincett, Grand Valley, both of Canada

[73] Assignee: Xerox Corporation, Stamford, Conn.

[21] Appl. No.: 480,642

[22] Filed: Mar. 31, 1983

[51] Int. Cl.³ .......................... G03G 5/04; C09D 5/24

[52] U.S. Cl. ...................................... 430/135; 430/41; 430/128; 427/76

[58] Field of Search ......................... 430/128, 41, 135; 427/75, 76

[56] References Cited

U.S. PATENT DOCUMENTS

| | | | |
|---|---|---|---|
| 2,426,377 | 8/1947 | Smith | 117/107 |
| 2,702,760 | 2/1955 | Barth | 117/38 |
| 3,253,945 | 5/1966 | Cauley | 117/106 |
| 3,410,636 | 11/1968 | Herrick | 350/288 |
| 3,598,644 | 8/1971 | Goffe . | |
| 3,683,847 | 8/1972 | Carleton | 118/48 |
| 3,924,563 | 12/1975 | Kessler | 118/49.1 |
| 4,084,966 | 4/1978 | Haas | 96/1 |
| 4,094,269 | 7/1978 | Malinovski et al. | 118/49.1 |
| 4,310,614 | 1/1982 | Connell et al. | 430/271 |

FOREIGN PATENT DOCUMENTS 819067 7/1969 Canada .

*Primary Examiner*—John E. Kittle
*Assistant Examiner*—John L. Goodrow
*Attorney, Agent, or Firm*—Peter H. Kondo; John E. Beck; Ronald Zibelli

[57] ABSTRACT

A process for depositing particles within a softenable layer to form a migration imaging member wherein the layer is softened by heating, exposed in a first deposition zone to a high impingement rate of vapors of selenium or selenium alloy moving along in a line of sight path from a selenium or selenium alloy source to form a sub-surface monolayer of spherical particles comprising the selenium or selenium alloy, removed from the first deposition zone prior to a substantial dropoff in transmission optical density, exposed to a lower impingement rate of vapors of selenium or selenium alloy in a second deposition zone to increase the size of the spherical particles while maintaining a narrow particle size distribution and achieving a high surface packing density thereby increasing the transmission optical density of the imaging member, and thereafter removed from the second deposition zone prior to a substantial dropoff in transmission optical density.

8 Claims, 5 Drawing Figures

MULTISTAGE DEPOSITION PROCESS

BACKGROUND OF THE INVENTION

This invention relates generally to a process for depositing particles in a softenable layer to form a migration imaging member.

Migration imaging systems capable of producing high quality images of good density, continuous tone and high resolution are well known. Such imaging systems are disclosed, for example, in U.S. Pat. No. 4,084,966, the entire contact of which is hereby incorporated herein by reference. In a typical embodiment of these migration imaging systems, a latent image is formed on an imaging member comprising a substrate and a layer of softenable material containing electrically photosensitive migration imaging material. The latent image may be formed, for example, by electrically charging the member and exposing the charged member to a pattern of activating electromagnetic radiation, such as light. When the photosensitive migration imaging material is originally in the form of particles located just under the upper surface of the softenable material, the particles of the migration imaging material in the exposed areas of the migration member migrate toward the substrate when the member is developed by decreasing the resistance of the softenable layer sufficiently to allow migration of the migration imaging material in depth in the softenable material.

Various modes for developing such as softening the softenable layer sufficiently to allow migration of the migration material in depth in the softenable material are known. These various development modes include softening by liquid solvents, solvent vapors, heat and combinations thereof, as well as other methods of softening the softenable material to allow migration of the migration material in depth in the softenable material. Visualization of the latent image may also be affected by conventional dry or liquid electrostatographic toning techniques.

Various techniques may be utilized to deposit the migration imaging or marking material onto the surface of the softenable layer. These methods include coating a dispersion of particles in a volatile carrier onto the surface of the softenable layer and allowing the volatile carrier to evaporate; vacuum evaporating the migration material into the surface of the softenable layer; mixing marking particles with larger carrier particles and coating the surface of the softenable layer by cascading this mixture across the surface of the softenable layer as described, for example, in U.S. Pat. No. 2,618,551; coating the marking material onto the surface of the softenable layer by conventional coating techniques such as spraying, dipping, doctor blade coating, and draw down bar coating; and the like. The softenable layer is softened to permit embedding the migration material under the surface of the softenable layer.

One technique described in U.S. Pat. No. 3,598,644, the entire content incorporated herein by reference, involves vacuum deposition of migration marking material into the surface of a softenable layer by positioning a heat softened layer opposite a source of migration marking material vapors such as selenium. This technique produces particles of migration marking material in the surface of the softenable layer. However, the particles are undesirably small and do not scatter or absorb light sufficiently well to confer a high optical density on the film. The expression "optical density" as used herein is intended to mean "transmission optical density" and is represented by the formula:

$$\log_{10}[l_o/l]$$

where l is the transmitted light intensity and $l_o$ is the incident light intensity. Optical density is measured by diffuse densitometers with a blue Wratten No. 94 filter. When attempts are made to increase the size of the particles by increasing the mass per unit area of deposited material, some of the particles become so large that their lightscattering efficiency, for example to blue light, diminishes. Furthermore, the surface packing density of the particles may become low, with undesirably large gaps between the particles. Some of these gaps may be filled with very small particles, but these small particles do not scatter or absorb light very efficiently. The expression "surface packing density" is used herein to denote the ratio of the sum of the areas of the spheres projected normally onto the imaging menmber surface to the total surface area of the film. It is, therefore, not possible to obtain an optical density as high as could be obtained if all the particles could grow to about the optimum size for light-scattering with narrow size distribution and high surface packing density.

High optical density in migration imaging members allows high contrast densities in migration images made from the migration imaging members. High contrast density is highly desirable for most information storage systems. Contrast density is used herein to denote the difference between maximum and minimum optical density in a migration image. The maximum optical density value of an imaged migration imaging member is, of course, the same value as the optical density of an unimaged migration imaging member. The contrast densities in the order of 0.9 obtained with heat development of migration imaging members prepared with the vacuum deposition system described above were found to be undesirably low, for example, for preparing printing plates by contact exposure through imaged migration members. Thus, there is a continuing need for a better system for vacuum depositing larger migration imaging material particles with a narrow size distribution and high surface packing density to form a migration imaging member that is capable of forming images with high contrast density.

SUMMARY OF THE INVENTION

A process for depositing particles on a softenable layer to form a migration imaging member comprising heating at least the surface of the layer to soften the surface, contacting at a high impingement rate the surface in a first deposition zone with vapors comprising selenium or selenium alloy moving along a line of sight path from a selenium or selenium alloy source to form a sub-surface monolayer of spherical particles comprising the selenium or selenium alloy, removing the surface from the first deposition zone prior to a substantial dropoff in optical density of the member, contacting at a low impingement rate the surface in a second deposition zone with selenium or selenium alloy vapors to increase the size of the spherical particles and optical density while maintaining a narrow size distribution and achieving a high surface packing density, and removing the surface from the second deposition zone prior to a substantial dropoff in optical density.

The advantages of this improved method will become more apparent upon a consideration of the following disclosure of the invention, particularly when taken in conjunction with the accompanying drawings wherein.

Figure 1:
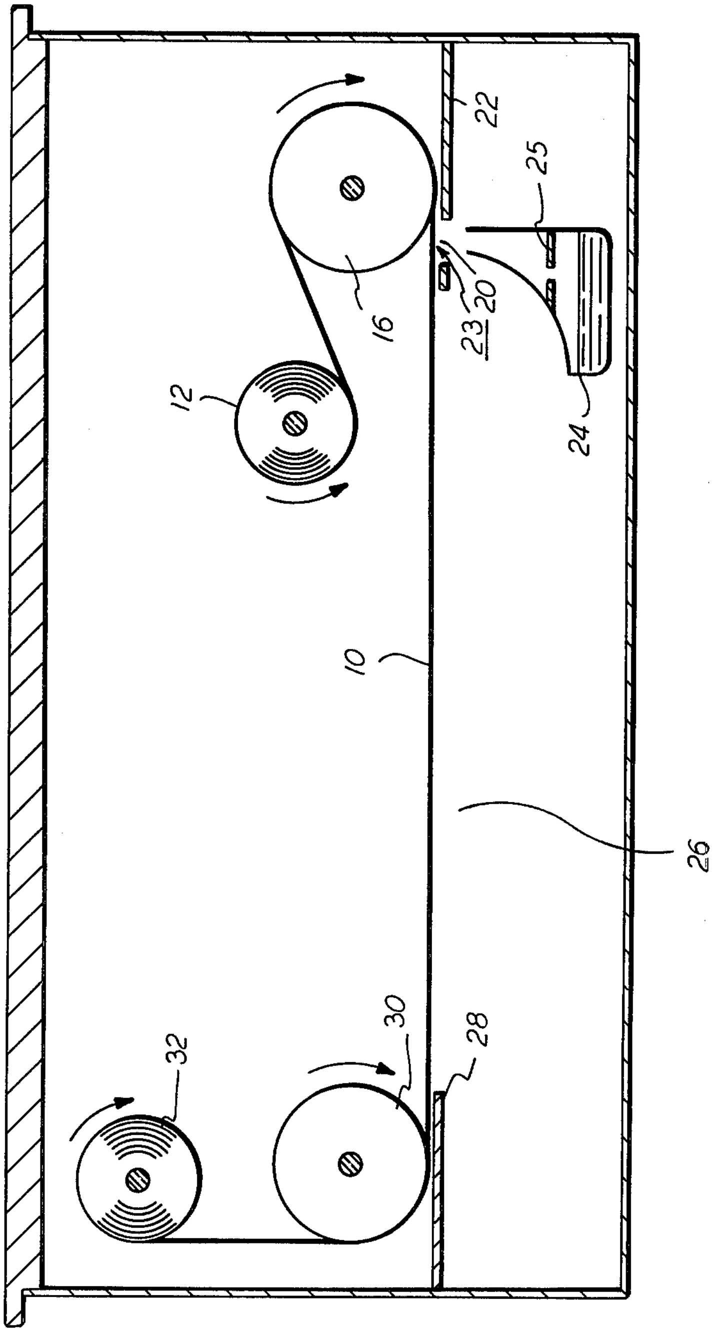
FIG. 1 is a schematic sectional view of a form of apparatus useful in carrying out the invention.

Referring to FIG. 1, a migration imaging web 10 comprising a supporting substrate having thereon a softenable layer is transported from a supply roll 12 around a portion of the periphery of hot roll 16 into contact at a high impingement rate with a stream of vapors of migration imaging material moving along a line of sight path through an opening 20 of mask 22 into a first deposition zone 23. The stream of migration imaging material is generated in a crucible 24 heated by conventional heating means (not shown) to vaporize the migration imaging material. The migration imaging web 10 is thereafter transported through a second deposition zone 26 in which it is exposed at a low impingement rate to vapors of migration imaging material which cause the migration imaging material particles deposited in the first deposition zone 23 to grow more slowly in size, thereby maintaining a narrow size distribution and achieving a high surface packing density. The migration imaging web 10 is then transported past the upstream edge of mask 28 and around at least a portion of the periphery of cold roll 30. If desired, additional cold rolls (not shown) may be utilized.

By exposing the migration imaging web 10 in the first deposition zone 23 to migration imaging material vapors at a high impingement rate moving along a line of sight path from a selenium or selenium alloy source such as crucible 24 to form migration imaging particles and thereafter exposing the deposited particles to selenium or selenium alloy vapor at a lower impingement rate in the longer second deposition zone 26, the migration imaging material particles deposited in the first deposition zone 23 is grown in size while maintaining a narrow size distribution and achieving a high surface packing density. Moreover, this growth may be effected without the necessity of reducing the speed of the migration imaging web 10 or using an impracticably long deposition zone as would be necessary if the entire deposition were carried out by exposure at a low impingement rate to vapors of selenium or selenium alloy.

The supporting substrate upon which the softenable layer is formed may be of any suitable self supporting inorganic or organic material. Typical supporting substrates include coated and uncoated films or webs such as polyesters, polyethylene terephthalate, polytetrafluoroethylene, polyamides, plastic coated papers, polyethylene, Mylar coated with aluminum, copper or copper iodide, and the like.

The softenable layer may be any suitable material which is softened in a liquid or vapor solvent or by heat, and in addition, is substantially electrically inert during the image developing cycle. Typical softenable material include Staybelite Ester 10, a 50 percent hydrogenated rosin ester, Foral Ester, a hydrogenated rosin triester, and Neolyne 23, an alkyd resin, all from hercules Powder Company; SR82 and SR84 silicone resins, both obtained from General Electric Corporation; sucrose benzoate from Eastman Chemical; Velsicol X-37, a polystyrene-olefin copolymer and Hydrogenated Velsicol X-37, from Velsicol Chemical Corporation; Hydrogenated Piccopale 100, a highly branched polyolefin, Piccotex 100, a polystyrene-vinyl toluene copolymer, Piccolastic A-75, 100 and 125, all polystyrenes, Piccodiene 2215, a polystyrene olefin copolymer, all from Pennsylvania Industrial Chemical Company; Araldite 6060 and 6071, epoxy resins of Ciba; R5061A, a phenyl-methyl silicone resin from Dow Corning; Epon 1001, a bisphenol-A-epichlorohydrin epoxy resin, from Shell Chemical Corporation; PS-2 and PS-3, both polystyrene, and ET693, a phenolformaldehyde resin, from Dow Chemical; a custom synthesized about 80/20 mole percent copolymer of styrene and hexylmethacrylate; paraffins and waxes; and any other suitable material which is softenable. The above group of materials is not intended to be limiting but merely illustrative of materials suitable for the softenable layer. The softenable layer may be of any suitable thickness. In general, the thicker the layer, the greater the potential need for adequate charging. A thickness from about 1 micrometer to about 4 micrometer has been found satisfactory. Layers outside this range will also work so long as the softenable layer is sufficiently thick to permit detectable migration of the marking material after imaging. In some embodiments, the material comprising the softenable layer may itself possess sufficient integrity so that the softenable layer containing or supporting the migration marking material may be self-supporting. Such self-supporting softenable layers may be used in conjunction with any suitable substrate at any time before, during, or after the imaging process.

"Softenable" as used herein is intended to mean any material which can be rendered more permeable thereby enabling particles to migrate through its bulk. Conventionally, changing the permeability of such material, reducing its viscosity, or reducing its resistance to migration of migration marking particles is accomplished by dissolving, melting, or softening by methods such as, for example, contact with heat, partial solvents, solvent vapors, swelling vapors, solvents, or combinations thereof, or by otherwise reducing the viscosity of the softenable material.

The migration imaging material may be selected from any suitable selenium composition. Typical selenium compositions include vitreous selenium, selenium alloyed with arsenic, tellurium, antimony, thallium, or bismuth. Pure selenium or selenium alloys doped with such materials as halogens as disclosed, for example, in U.S. Pat. No. 3,312,548 can be used.

The final average diameter of the spherical migration particles embedded as a sub-surface monolayer in the exposed surface of the softenable layer range from about 0.2 micrometer to about 0.4 micrometer with a range from about 0.3 micrometer to about 0.4 micrometer being preferred for optimum optical density. The spheres of the deposited migration imaging material are spaced from each other, but the distance between adjacent spheres is less than about one-half the diameter of the spheres, with much less distance being preferred for optimum optical density. The deposited spheres are generally from about 0.01 micrometer to about 0.1 micrometer below the outer surface of the softenable layer. The deposited migration imaging material particles can provide a significantly greater contrast density than prior art migration imaging members. More specifically, in comparison to about 1.7 maximum optical density of prior art migration imaging members, the imaging members of the instant invention can provide an optical density as high as about 1.85 to about 2.05 or higher. At the same time, available contrast densities are increased from about 0.9–1.0 of prior art migration imaging members to about 1.1–1.3 or higher for the migration imaging members of this invention.

The heated roll 16 may be heated by any suitable technique including infrared lamps, resistance elements, high boiling point fluids and the like. Generally, the temperature of the hot roll 16 should be sufficient to heat the softenable layer and reduce the viscosity of the softenable layer to between about $10^3$ poises to about $10^9$ poises. Various factors affect the temperature to which the heated roll 16 should be heated. Factors to be considered in the selection of the appropriate temperature of the hot roll 16 include the specific softenable material, the specific migration marking particle material, the rate of deposition of the migration material, and the like to achieve formation of a monolayer of migration imaging material particles embedded below the surface of the softenable layer. When a softenable layer of a copolymer containing about 80 mole percent styrene and about 20 mole percent hexylmethacrylate having a molecular weight of about 50,000 is heated to a temperature less than about 110° C. or more than about 120° C., the resulting final migration imaging member showed a markedly lower optical density than when heated to temperatures within this range.

At least one of the long edges of the slot 20 positioned substantially transversely to the direction of travel of the migration imaging web 10 should preferably be concave to form a slot opening which becomes wider from the center of the web toward each end of slot 20. The second long edge of the slot 20 positioned substantially transversely to the direction of travel of migration imaging web 10 may also be concave (e.g. butterfly shaped slot) or straight. The gradual widening of the slot 20 from the center toward the ends promotes more uniform deposition of migration imaging material particles across the width of migration imaging web 10. Because of various factors such as speed of the imaging web, distance of the mask opening to the surface of the softenable layer, distance between the mask opening and the source of the migration imaging material vapors and the like, the specific shape of the mask opening 20 should be determined by trail and error keeping in mind that uniformity of deposition of the migration imaging material is affected by the shape of the mask opening 20. The heated crucible 24 is the source of the concentrated vapors of migration imaging material for the first deposition zone. The crucible 24 may comprise one or more crucibles and may be of any suitable shape. Heating may be effected by any suitable conventional means (not shown) such as resistance heaters and the like. An important characteristic of the crucible 24 is that it prevents or minimizes "spitting" of unvaporized molten migration imaging material against the softenable layer. The crucible illustrated as heated crucible 24 has a relatively narrow opening near the top of the crucible to minimize spitting. If desired, suitable baffles or a mask 25 having, for example, a 1 millimeter slit can be positioned between the opening of the crucible and the molten migration imaging material to prevent spitting. If desired, the opening of the crucible may also have a butterfly shape. However, it is somewhat difficult to manufacture crucibles having butterfly shaped openings. The vapor stream of migration imaging materials in the first deposition zone moves along a line of sight path directly from the selenium or selenium alloy source of the heated softenable layer.

During deposition, the migration imaging material in the crucible should be maintained at a temperature of about 230° C. to about 375° C. Generally, temperatures less than about 230° C. result in impingement rates that are too low. Temperatures above about 375° C. require excessive web speeds and present difficulties in adequately softening the softenable layer. This temperature may be regulated by any suitable means such as by controlling the heating of crucible 24.

The speed of the migration imaging web 10 through the first deposition zone 23 and second deposition zone 26 may be as high as about 50 feet per minute or more, the speed depending upon the heating capabilities of the system. The speed of the migration imaging web 10 affects the size of the opening selected for slot 20 as well as the impingement rate of migration material needed in the first deposition zone 23. More specifically, when the speed of the migration imaging web 10 is increased, the size of the opening for slot 20 must also be increased and/or the temperature of the crucible 24 must also be increased. Conversely, when the speed of the migration imaging web 10 is reduced, the size of the opening for slot 20 and/or the temperature of the crucible 24 must also be reduced.

Generally, excellent results may be acheived in the first deposition zone by maintaining therein a high selenium or selenium alloy vapor impingement rate between about 0.1 micrometer per second and about 0.6 micrometer per second at web speeds between about 10 feet per minute and about 50 feet per minute. The rate of impingement is equal to the amount of migration imaging material, measured as the thickness of a theoretical continuous film based on the total volume of the particles, deposited in a given area divided by the time the given area is exposed to the imaging material vapors. The measurements were made near the centerline of the migration imaging web 10. The rate of impingement calculations are based in the assumption that the majority of material deposited remains in the web and does not reevaporate at the web temperature employed. This assumption is considered substantially accurate and appropriate at the temperatures utilized. See D. Buckley, G. Brown, and F. Belli, Surface Technology, 12, 257–264, (1981) for further details as to the rate of reevaporation, the entire disclosure thereof being incorporated herein by reference. The temperatures of the crucible is adjusted experimentally to obtain the desired rate of impingement.

The deposition of the migration imaging material in the first deposition zone should be sufficient to provide a monolayer of migration imaging material particles having an optical density of at least about 1.5. Generally, an optical density of less than about 1.5 renders a process less practical because a relatively large amount of material must be deposited at a relatively low rate in the second deposition zone downstream thereby requiring either a very extended zone or a low throughput speed. Since a maximum optical density of only about 1.7 can be achieved in the first deposition zone regardless of the number of crucibles utilized, a single crucible source for the steam of vapors of migration imaging material has been found to be quite satisfactory. Moreover, when deposition in the first deposition zone is continued after an optical density of about 1.7 is achieved, the optical density begins to decline. Since the decline of optical density in the first deposition zone is undesirable, the migration imaging member 10 should be removed from the first deposition zone prior to a substantial dropoff in optical density. The expression "substantial dropoff in optical density" is intended to mean more than a value of about 0.05. An optical density dropoff of more than about 0.05 renders the process less effective and increases the number of undesirable small migration imaging material particles in the final imaging member and reduces the surface packing density. Variables such as web speed, temperature of the crucible, distance of the mask from the web, width of the slot and the like described above and hereinafter, are adjusted experimentally to ensure timely termination of deposition prior to substantial dropoff in optical density in the first deposition zone. This optical density may be determined by measurement of migration imaging members made during set-up experiments.

The deposited particles in the first deposition zone have an average particle size between about 0.2 micrometer and about 0.3 micrometer. These deposited particles are generally formed in the first deposition zone is less than about 1 second.

The entire deposition process should preferably be conducted in a chamber at a vacuum of better than about $10^{-2}$ Torr because at pressures more than about this value, the selenium or selenium alloy vapor tends to form particles (i.e. smoke) prior to reaching the heated softenable layer. Excellent results have been achieved with a vacuum of about $10^{-4}$ Torr.

The source of migration imaging material vapors for the second deposition zone 26 may, if desired, comprise the heated crucible for the first deposition zone. Some of the vapors from the crucible 24 for the first deposition zone spill over and flow downstream toward the cold roll 30. If desired, additional crucibles in the downstream deposition zone may be utilized to provide additional migration imaging material vapors. Normally, the vapors in the second deposition zone will be at a similar temperature to those in the first deposition zone. However, supplemental sources of heat may be employed, if desired. It is important that the impingement rate of selenium or of selenium alloy vapors be lower in the second deposition zone 26 than that in the first deposition zone 23 by at least a factor of 2. An impingement rate difference of about 10 is preferred for optimum formation of larger spheres of the deposited migration imaging material particles, maintaining a narrow size distribution, and achieving a high surface packing density and a high optical density. High surface packing densities of 75 percent or greater and contrast densities of 1.1–1.3 or higher may be achieved with the multiple impingement rate process of this invention. An impingement rate difference of about 50 or greater is believed possible so long as the rate is not so excessively low that that the deposited migration imaging material reevaporates at a greater rate than the impingement rate in most of the second deposition zone. In any event, the time required for suitable growth becomes commercially impractical when the impingement rate in the second deposition zone is unduly low.

The length of the second deposition zone 26 should be sufficient to permit migration imaging material particles deposited in the first deposition zone 23 to grow more slowly at a lower impingement rate to an average size of between about 0.2 micrometer and about 0.4 micrometer and more preferably to between about 0.3 micrometer and about 0.4 micrometer to provide a deposited monolayer of migration imaging material particles with high surface packing density, narrow size distribution, and an optical density preferably between about 1.85 and about 2.05 or more. Generally, the length of the second deposition zone 26 should be at least three times the length of the first deposition zone 23 to obtain sufficient growth of the migration imaging material particles deposited in the first deposition zone 23. Greater lengths for the second deposition zone 26 may be used to the point where such increased length becomes impractical. In selecting the length for the second deposition zone 26, factors such as impingement rate should be considered to permit migration imaging material particles deposited in the first deposition zone 23 to grow more slowly at a lower impingement rate to the average size described above.

The cold roll 30 is normally at room temperature. If desired, the cold roll 30 may be maintained at temperatures lower than room temperature with any suitable technique such as cooling with ice water. The temperature of the cold roll should be sufficiently low to prevent blocking of the softenable layer after migration imaging web 10 is wound on take up roll 32. The specific blocking temperature, of course, depends upon the particular softenable material employed in the softenable layer.

Although the tension of the migration imaging web 30 during the coating process does not appear critical, it should be sufficient to provide good contact with both hot roll 16 and the cold roll 30. The migration imaging web 10 is normally transported over the heated roll 16 and the cold roll 30 and with a supporting substrate positioned between the softenable layer and heated roll 16 and the cold roll 30.

Surprisingly, the deposition of a stream of concentrated vapors of the migration imaging material at a high impingement rate in a first deposition zone followed by exposure of the deposited migration imaging material particles to migration imaging material vapors at a lower impingement rate in a second deposition zone while the softenable layer remains warm allows larger spheres of the deposited migration imaging material particles to form, while maintaining a narrow size distribution and achieving a high surface packing density, thereby providing a migration imaging member having improved contrast density.

DESCRIPTION OF THE PREFERRED EMBODIMENTS

The following examples further define, describe and compare exemplary methods of preparing migration imaging members of the present invention and of utilizing them in a development process. Parts and percentages are by weight unless otherwise indicated. The examples, other than the control examples, are also intended to illustrate the various preferred embodiments of the present invention.

EXAMPLE 1

Figure 2:
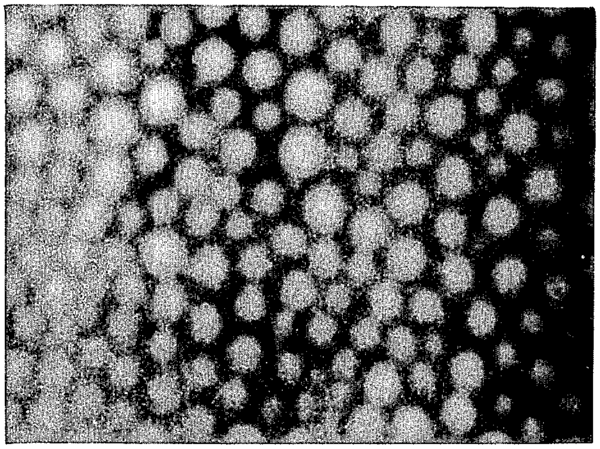
FIGS. 2–5 represent electron micrographs of different forms of migration imaging members.

A web about 31 centimeters wide of aluminized Mylar, a polyester resin available from DuPont, overcoated on the aluminized side with about a 1.5 micrometer thick layer of a custom synthesized 80/20 mole percent copolymer of styrene and hexylmethacrylate having a weight average molecular weight of about 45,000 was treated in a vacuum evaporation chamber at a vacuum of about $4\times10^{-4}$ Torr. The web was advanced at a rate of about 20 feet per minute from a supply roll around approximately 70 percent of the circumference of an 18 centimeter diameter hot roll with the Mylar side of the web in contact with the hot roll. The web was thereafter advanced horizontally over a deposition zone, brought into contact with a 10 centimeter diameter cold roll and 18 centimeter cold roll and finally wound around a take up roll. The apparatus for carrying out this process is similar to the apparatus schematically illustrated in FIG. 1 except that the apparatus actually employed did not have a second deposition zone as illustrated. An alloy of about 99+ percent by weight selenium and less than 1 percent by weight impurities was heated to a temperature of about 320° C. in a stainless steel crucible positioned beneath the web as illustrated in FIG. 1. A mask was interposed between the upper opening of the stainless steel crucible and the web with a slot positioned transversely to the direction of movement of the web and above the upper opening of the stainless steel crucible as shown in FIG. 1. The slot had a length of about 30 centimeters, a center slot width of about 7.6 centimeters and slot end widths of about 8.9 centimeters. The slot was the only opening between the crucible and the web. The distance between the mask and the web was about 1 centimeter and the distance between the mask and the surface of the molten alloy in the crucible was about 13 centimeters. The vapors moved along a line of sight path from the bottom of the crucible to the deposition zone between the slot and the web and impinged on the web at a rate of about 0.2 micrometer per second which is equivalent to an impingement rate of about 100 micrograms per $cm^2$ per second. The vapor receiving surface of the softenable copolymer layer was heated by the hot roll maintained at a temperature of about 115° C. to raise the temperature of the copolymer to about 115° C. and more importantly, to lower the viscosity of the exposed surface of the copolymer to about $5\times10^3$ poises. After deposition of the alloy, the web was rapidly chilled to room temperature or below by two cold rolls, only one of which is illustrated in FIG. 1, before being wound on the take up roll. The cold rolls were maintained at a temperature of about 10° C. A monolayer of selenium alloy spheres having an average diameter of about 0.3 micrometer embedded about 0.05–0.1 micrometer below the exposed surface of the copolymer layer was formed. As illustrated in FIG. 2, the surface packing density of the particles was about 70 percent and a significant number of undesirable particles smaller than about 0.1 micrometer were present in the monolayer. Referring, for example to FIG. 2, the surface packing density is the sum of the areas of the spheres projected normally onto the film surface, i.e. light areas, divided by the total area of FIG. 2. The resulting migration imaging member was thereafter imaged and developed by heat processing techniques comprising the steps of corotron charging to a surface potential of about −120 volts, exposing to activating radiation through a step-wedge and developing by heating to 115° C. for 5 seconds on a hot plate in contact with the Mylar. The contrast density of the imaged migration imaging member was determined to be about 0.95 and maximum optical density was about 1.72. This optical density is believed to be about the highest optical density obtainable with a single deposition step. Contrast density was measured with a MacBeth Model TD 504 Diffuse Densitometer with a blue Wratten No. 94 filter. The process of this example was conducted to provide a control for purposes of comparison with the migration imaging process of the instant invention.

EXAMPLE II

Figure 3:
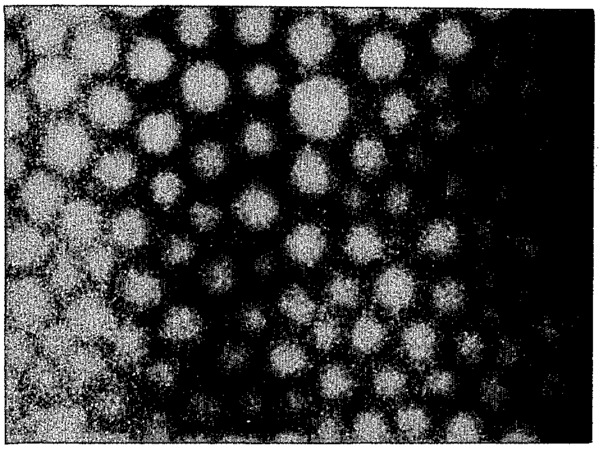

The materials and procedures utilized in Example I were repeated except that additional selenium was vapor deposited on the softenable layer in an attempt to increase the optical density. The additional selenium was deposited by increasing the selenium temperature to about 322° C. to increase the deposition rate onto the web. This led to the formation of a wider size distribution, lower surface packing density, and more small particles, and to a reduction in optical density to about 1.67. This is shown in FIG. 3. It is clearly apparent that the properties of the migration imaging web obtained with the process of this Example is inferior to the properties of the migration imaging web of Example I.

EXAMPLE III

Figure 4:
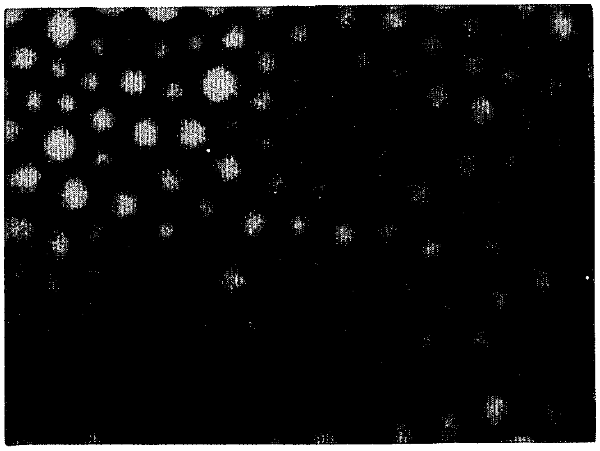
Figure 5:

The materials and procedures utilized in Example I were repeated except that a second deposition zone was provided between the first deposition zone and the cold roll as illustrated in FIG. 1. The impingement rate in the first deposition zone of this Example was about the same as the impingement rate in the single deposition zone of Example I. The width of the lip of the mask between the first and and second deposition zones was about 3 centimeters. The length of the second deposition zone was about 36 centimeters. The crucible located below the first deposition zone also served as the source of the alloy vapors for the second deposition zone as shown in FIG 1. The selenium average impingement rate in the second deposition zone was about 0.01 micrometer per second or about 5 micrograms per $cm^2$ per second. A monolayer of selenium spheres having an average diameter of about 0.33 micrometer embeded about 0.05–0.1 micrometer below the exposed surface of the copolymer was formed. The surface packing density of the particles was about 80 percent and, unlike the results shown in FIG. 2, very few particles smaller than 0.1 micrometer were present as shown in FIG. 4. The resulting migration imaging member was imaged and examined for contrast density as described in Example I. The contrast density and maximum optical density obtained were about 1.25 and 1.95, respectively. It is clearly apparent that the contrast density and maximum optical density obtained with the process of this Example is significantly greater than the contrast density and maximum optical density of the processes of Examples I and II. Since the maximum optical density is a logarithmic measurement to the base 10, a difference of 0.3 in optical density is equivalent to a factor of 2 in a light transmission. Thus, the difference in maximum optical density of about 0.23 and about 0.28 between the migration imaging member of this Example and those of Examples I and II, respectively, is a significant improvement.

EXAMPLE IV

The materials and procedures utilized in Example III were repeated except that additional selenium alloy was deposited on the softenable layer in an attempt to increase the optical density. The additional selenium was deposited by increasing the selenium temperature to about 322° C. to increase the deposition rate. This led to a decrease in optical density, probably partly due to a reduction in the narrowness of the size distribution and in surface packing density and partly because the scattering efficiency of particles falls when the particles exceed a certain size. Such a structure is shown in FIG.

5. This is clearly, however, not as poor as that shown in FIGS. 2 and 3. The maximum optical density of about 1.85 for the migration imaging member of this Example was still much higher than the optical densities of 1.72 and 1.67 for the structures shown in FIGS. 2 and 3, respectively, but less than that of Example III (1.95).

EXAMPLE V

The materials and procedures utilized in Example III were repeated except that the crucible located in the first deposition zone was heated to a temperature of about 335° C. and the web was advanced at a rate of about 35 feet per minute. The high selenium impingement rate in the first deposition zone was about 0.35 micrometer per second or about 170 micrograms per $cm^2$ per second. The lower impingement rate in the second deposition zone was at an average rate of about 0.02 micrometer per second or about 1 micrograms per $cm^2$ per second. The resulting migration imaging member was imaged and examined for contrast density as described in Example I. The contrast density and maximum optical density obtained were about 1.2 and 1.9, respectively. It is clearly apparent that the contrast density obtained with the process of this Example is significantly greater than the contrast density of the migration imaging webs of Examples I and II.

EXAMPLE VI

The materials and procedures utilized in Example III were repeated except that the copolymer was replaced by a copolymer of about 65 percent by weight styrene and 35 percent by weight n-butyl methacrylate having a weight average molecular weight of about 50,000. The contrast density and maximum optical density obtained were about 1.23 and 1.92, respectively. It is clearly apparent that the contrast density with the process of this Example is significantly greater than the contrast density obtained with the processes of Examples I and II.

EXAMPLE VII

A web about 15 centimeters wide of aluminized Mylar, a polyester resin available from DuPont, overcoated on the aluminized side with about a 3 micrometer thick layer of an 80/20 percent copolymer of styrene and hexyl methacrylate having a weight average molecular weight of about 50,000 was treated in a vacuum evaporation chamber at a vacuum of about $10^{-4}$ Torr. The web was advanced at a rate of about 15 feet per minute from a supply roll around approximately 70 percent of the circumference of an 18 centimeter diameter hot roll with the Mylar side of the web in contact with the hot roll. The web was thereafter advanced horizontally over a deposition zone, brought into contact with a 10 centimeter diameter cold roll and an 18 centimeter diameter cold roll and finally wound around a take up roll. The apparatus for carrying out this process was similar to the apparatus schematically illustrated in FIG. 1 except that there was no second deposition zone and two cold rolls rather than one were used. An alloy of about 80 percent by weight selenium and about 20 percent by weight tellurium based on the total weight of the alloy, was heated to a temperature of about 320° C. in a stainless steel crucible positioned beneath the web as illustrated in FIG. 1. A mask was interposed between the upper opening of the stainless steel crucible and the web with a slot positioned transversely to the direction of movement of the web and above the upper opening of the stainless steel crucible as shown in FIG. 1. The slot had a length of about 15 centimeters, a center slot width of about 7.6 centimeters and slot end widths of about 8 centimeters. The slot was the only opening between the crucible and the web. The distance between the mask and the web was about 1 centimeter and the distance between the mask and the surface of the molten alloy in the crucible was about 13 centimeters. The vapors moved along a line of sight path from the bottom of the crucible to the deposition zone between the slot and the web and deposited on the web at about 0.15 micrometer per second or about 70 micrograms per $cm^2$ per second. The vapor receiving surface of the softenable polymer layer was heated by the hot roll maintained at a temperature of about 115° C. to raise the temperature of the polymer to about 115° C. to lower the viscosity of the exposed surface of the polymer to about $5 \times 10^3$ poises. After deposition of the alloy, the web was rapidly chilled to room temperature or below by the cold rolls before being wound on the take up roll. The cold rolls were maintained at a temperature of about 10° C. A monolayer of selenium alloy spheres having an average diameter, size distribution and surface packing density similar to that obtained in Example I' and embedded about 0.05–0.1 micrometer below the exposed surface of the copolymer layer was formed. The resulting migration imaging member was thereafter imaged and developed by vapor processing techniques comprising the steps of corotron charging to a surface potential of about +120 volts, exposing to activating radiation through a stepwedge and exposing for about 5 seconds to vapors of 1,1,1-trichloroethane in a chamber held at room temperature. The contrast density of the imaged migration imaging member measured with the densitometer described in Example I was about 0.9.

EXAMPLE VIII

The materials and procedures utilized in Example VII can be repeated except that a second deposition zone is to be provided between the first deposition zone and the cold roll as illustrated in FIG. 1. The width of the lip of the mask between the first and and second deposition zones should be about 3 centimeters. The length of the second deposition zone is about 36 centimeters. The crucible located below the first deposition zone also serves as the source of the alloy vapors for the second deposition zone as shown in FIG. 1. The impingement rate in the first deposition zone is expected to be substantially the same as that in the first deposition zone of Example VII. The impingement rate in the second deposition zone is expected to average about 0.01 micrometer per second or about 5 micrograms per $cm^2$ per second. The average particle size is expected to be slightly larger than that in Example VII, but the size distribution is expected to be narrower and the surface packing density higher. The resulting migration imaging member can be imaged and examined for contrast density as described in Example VII. The contrast density obtained is expected to be about 1.1–1.3. It is apparent that the anticipated contrast density with the process of this Example is expected to be significantly greater than the migration imaging member of Example VII.

EXAMPLE IX

A web about 15 centimeters wide of aluminized Mylar, a polyester resin available from DuPont, overcoated on the aluminized side with about a 1.5 micrometer thick layer of a 65/35 weight percent copolymer of styrene and n-butyl methacrylate having a weight average molecular weight of about 50,000 can be treated in a vacuum evaporation chamber at a vacuum of about $10^{-4}$ Torr. The web should be advanced at a rate of about 15 feet per minute from a supply roll around approximately 70 percent of the circumference of an 18 centimeter diameter hot roll with the Mylar side of the web in contact with the hot roll. The web is thereafter advanced horizontally over a first deposition zone, a second deposition zone, brought into contact with a 10 centimeter diameter cold roll and 18 centimeter diameter cold roll and finally wound around a take up roll. The apparatus for carrying out this process is similar to the apparatus schematically illustrated in FIG. 1 except that two cold rolls are to be used instead of one. An alloy of about 80 percent by weight selenium and about 20 percent by weight tellurium based on the total weight of the alloy, is heated to a temperature of about 320° C. in a stainless steel crucible positioned beneath the web as illustrated in FIG. 1. A mask is interposed between the upper opening of the stainless steel crucible and the web with a slot positioned transversely to the direction of movement of the web and above the upper opening of the stainless steel crucible as shown in FIG. 1. The slot should have a length of about 15 centimeters, a center slot width of about 7.6 centimeters and slot end widths of about 8 centimeters. The distance between the mask and the web is about 1 centimeter and the distance between the mask and the surface of the molten alloy in the crucible is about 13 centimeters. The impingement rate in the first deposition zone is expected to be substantially the same as that in the first deposition zone of Example VII. The width of the lip of the mask between the first and second deposition zones is about 3 centimeters. The vapor receiving surface of the softenable polymer layer is heated by the hot roll maintained at a temperature of about 115° C. to raise the temperature of the polymer to about 115° C. and to lower the viscosity of the exposed surface of the copolymer to about $10^4$ poises. After deposition of the alloy, the web is transported through a second deposition zone having a length of about 36 centimeters. The impingement rate in the second deposition zone is expected to be similar to that in the second deposition zone of Example VIII. The web should then be rapidly chilled to room temperature or below by the cold rolls illustrated in FIG. 1 before being wound on the take up roll. The cold rolls are to be maintained at a temperature of about 10° C. A monolayer of selenium alloy spheres having an average diameter and a size distribution and surface packing density similar to that of Example III embedded about 0.05-0.1 micrometer below the exposed surface of the copolymer layer is expected to be formed. The resulting migration imaging member can thereafter be imaged and developed by vapor processing techniques comprising the steps of corotron charging to a surface potential of about +120 volts, exposing to activating radiation through a step-wedge and exposing for about 5 seconds to vapors of 1,1,1-trichloroethane in a chamber held at room temperature. The contrast density of the imaged migration imaging member measured with the densitometer described in Example I is expected to be about 1.1-1.3.

EXAMPLE X

A web about 15 centimeters wide of aluminized Mylar, a polyester resin available from DuPont, overcoated on the aluminized side with about a 2.5 micrometer thick layer of a copolymer of styrene and butadiene having a weight average molecular weight of about 45,000 can be treated in a vacuum evaporation chamber at a vacuum of about $5\times10^{-5}$ Torr. The web should be advanced at a rate of about 17 feet per minute from a supply roll around approximately 70 percent of the circumference of an 18 centimeter diameter hot roll with the Mylar side of the web in contact with the hot roll. The web can thereafter be advanced horizontally over a first deposition zone, a second deposition zone, brought into contact with a 10 centimeter diameter cold roll and 18 centimeter cold roll and finally wound around a take up roll. The apparatus for carrying out this process is similar to the apparatus schematically illustrated in FIG. 1 except that two cold rolls can be used instead of one. An alloy of about 80 percent by weight selenium and about 20 percent by weight tellurium based on the total weight of the alloy, is heated to a temperature of about 320° C. in a stainless steel crucible positioned beneath the web as illustrated in FIG. 1. A mask is interposed between the upper opening of the stainless steel crucible and the web with a slot positioned transversely to the direction of movement of the web and above the upper opening of the stainless steel crucible as shown in FIG. 1. The slot should have a length of about 15 centimeters, a center slot width of about 7.6 centimeters and slot end widths of about 8 centimeters. The distance between the mask and the web is about 1 centimeter and the distance between the mask and the surface of the molten alloy in the crucible is about 13 centimeters. The width of the lip of the mask between the first and second deposition zones is about 3 centimeters. The vapor receiving surface of the softenable polymer layer is heated by the hot roll maintained at a temperature of about 115° C. to raise the temperature of the polymer to about 115° C. to lower the viscosity of the exposed surface of the copolymer to about $9\times10^4$ poises. After deposition of the alloy, the web is transported through a second deposition zone having a length of about 36 centimeters. The web is then rapidly chilled to room temperature or below by the cold rolls illustrated in FIG. 1 before being wound on the take up roll. The cold rolls should be maintained at a temperature of about 10° C. A monolayer of selenium alloy spheres having an average diameter and a size distribution and surface packing density similar to that of Example VIII embedded about 0.05-0.1 micrometer below the exposed surface of the copolymer layer is expected to be formed. The resulting migration imaging member can thereafter be imaged and developed by vapor processing techniques comprising the steps of corotron charging to a surface potential of about +120 volts, exposing to activating radiation through a step-wedge and exposing for about 5 seconds to vapors of 1,1,1-trichloroethane in a chamber held at room temperature. The contrast density of the imaged migration imaging member measured with the desitometer described in Example I is expected to be about 1.1-1.3.

EXAMPLE XI

A web about 15 centimeters wide of aluminized Mylar, a polyester resin available from DuPont, was overcoated on the aluminized side with about a 2.5 micrometer thick layer of a copolymer of styrene and butadiene having a weight average molecular weight of about 45,000 and then treated in a vacuum evaporation chamber at a vacuum of about $5\times10^{-5}$ Torr. The web was advanced at a rate of about 17 feet per minute from a supply roll around approximately 70 percent of the circumference of an 18 centimeter diameter hot roll with the Mylar side of the web in contact with the hot roll. The web was thereafter advanced horizontally over a first deposition zone, a second deposition zone, brought into contact with a 10 centimeter diameter cold roll and 18 centimeter diameter cold roll and finally wound around a take up roll. The apparatus for carrying out this process was similar to the apparatus schematically illustrated in FIG. 1 except that two cold rolls were used. Selenium was heated to a temperature of about 320° C. in a stainless steel crucible positioned beneath the web as illustrated in FIG. 1. A mask was interposed between the upper opening of the stainless steel crucible and the web with a slot positioned transversely to the direction of movement of the web and above the upper opening of the stainless steel crucible as shown in FIG. 1. The slot had a length of about 15 centimeters, a center slot width of about 7.6 centimeters and slot end widths of about 8 centimeters. The distance between the mask and the web was about 1 centimeter and the distance between the mask and the surface of the molten selenium in the crucible was about 13 centimeters. The width of the lip of the mask between the first and second deposition zones was about 3 centimeters. The vapor receiving surface of the softenable polymer layer was heated by the hot roll maintained at a temperature of about 115° C. to raise the temperature of the polymer to about 115° C. and more importantly, to lower the viscosity of the exposed surface of the copolymer to about $9\times10^4$ poises. After deposition of the selenium, the web was transported through a second deposition zone having a length of about 36 centimeters. The web was then rapidly chilled to room temperature or below by the cold rolls illustrated in FIG. 1 before being wound on the take up roll. The cold rolls were maintained at a temperature of about 10° C. A monolayer of selenium spheres having an average diameter and a size distribution and surface packing density similar to that of Example III embedded about 0.05–0.1 micrometer below the exposed surface of the copolymer layer was formed. The resulting migration imaging member was thereafter imaged and developed by vapor processing techniques comprising the steps of corotron charging to a surface potential of about +120 volts, exposing to activating radiation through a step-wedge and exposing for about 5 seconds to vapors of 1,1,1-trichloroethane in a chamber held at room temperature. The contrast density of the imaged migration imaging member measured with the densitometer described in Example I was determined to be about 1.15.

EXAMPLE XII

A web about 15 centimeters wide of aluminized Mylar, a polyester resin available from DuPont, overcoated on the aluminized side with about a 3 micrometer thick layer of a 60/40 mole percent copolymer of styrene and acrylate having a weight average molecular weight of about 73,000 can be treated in a vacuum evaporation chamber at a vacuum of about $5\times10^{-4}$ Torr. The web should be advanced at a rate of about 15 feet per minute from a supply roll around approximately 70 percent of the circumference of an 18 centimeter diameter hot roll with the Mylar side of the web in contact with the hot roll. The web can thereafter be advanced horizontally over a first deposition zone, a second deposition zone, brought into contact with a 10 centimeter diameter cold roll and 18 centimeter cold roll and finally wound around a take up roll. The apparatus for carrying out this process is similar to the apparatus schematically illustrated in FIG. 1 except that two cold rolls are used instead of one. An alloy of about 80 percent by weight selenium and about 20 percent by weight tellurium based on the total weight of the alloy, is heated to a temperature of about 320° C. in a stainless steel crucible positioned beneath the web as illustrated in FIG. 1. A mask can then be interposed between the upper opening of the stainless steel crucible and the web with a slot positioned transversely to the direction of movement of the web and above the upper opening of the stainless steel crucible as shown in FIG. 1. The slot has a length of about 15 centimeters, a center slot width of about 7.6 centimeters and slot end widths of about 8 centimeters. The distance between the mask and the web is about 1 centimeter and the distance between the mask and the surface of the molten alloy in the crucible is about 13 centimeters. The width of the lip of the mask between the first and second deposition zones is about 3 centimeters. The vapor receiving surface of the softenable polymer layer is heated by the hot roll maintained at a temperature of about 118° C. to raise the temperature of the polymer to about 118° C. to lower the viscosity of the exposed surface of the copolymer to about $10^3$ poises. After deposition of the alloy, the web is transported through a second deposition zone having a length of about 36 centimeters. The web is then rapidly chilled to room temperature or below by the cold rolls illustrated in FIG. 1 before being wound on the take up roll. The cold rolls are maintained at a temperature of about 10° C. A monolayer of selenium alloy spheres having an average diameter and a size distribution and surface packing density similar to that of Example III embedded about 0.05–0.1 micrometer below the exposed surface of the copolymer layer is expected to be formed. The resulting migration imaging member is thereafter imaged and developed by vapor processing techniques comprising the steps of corotron charging to a surface potential of about +120 volts, exposing to activating radiation through a step-wedge and exposing for about 5 seconds to vapors of 1,1,1-trichloroethane in a chamber held at room temperature. The contrast density of the imaged migration imaging member measured with the densitometer described in Example I is expected to be about 1.2.

EXAMPLE XIII

A web about 15 centimeters wide of aluminized Mylar, a polyester resin available from DuPont, was overcoated on the aluminized side with about a 3 micrometer thick layer of a 60/40 mole percent copolymer of styrene and acrylate having a weight average molecular weight of about 73,000 and then treated in a vacuum evaporation chamber at a vacuum of about $5\times10^{-4}$ Torr. The web was advanced at a rate of about 15 feet per minute from a supply roll around approximately 70 percent of the circumference of an 18 centimeter diameter hot roll with the Mylar side of the web in contact with the hot roll. The web was thereafter advanced horizontally over a first deposition zone, a second deposition zone, brought into contact with a 10 centimeter diameter cold roll and 18 centimeter cold roll and finally wound around a take up roll. The apparatus for carrying out this process was similar to the apparatus schematically illustrated in FIG. 1 except that two cold rolls were used. Selenium was heated to a temperature of about 320° C. in a stainless steel crucible positioned beneath the web as illustrated in FIG. 1. A mask was interposed between the upper opening of the stainless steel crucible and the web with a slot positioned transversely to the direction of movement of the web and above the upper opening of the stainless steel crucible as shown in FIG. 1. The slot had a length of about 15 centimeters, a center slot width of about 7.6 centimeters and slot end widths of about 8 centimeters. The distance between the mask and the web was about 1 centimeter and the distance between the mask and the surface of the molten selenium in the crucible was about 13 centimeters. The width of the lip of the mask between the first and second deposition zones was about 3 centimeters. The vapor receiving surface of the softenable polymer layer was heated by the hot roll maintained at a temperature of about 118° C. to raise the temperature of the polymer to about 118° C. and more importantly, to lower the viscosity of the exposed surface of the copolymer to about $10^3$ poises. After deposition of the selenium, the web was transported through a second deposition zone having a length of about 36 centimeters. The web was then rapidly chilled to room temperature or below by the cold rolls illustrated in the drawing before being wound on the take up roll. The cold rolls were maintained at a temperature of about 10° C. A monolayer of selenium spheres having an average diameter and a size distribution and surface packing density similar to that of Example III embedded about 0.05–0.1 micrometer below the exposed surface of the copolymer layer was formed. The resulting migration imaging member was thereafter imaged and developed by vapor processing techniques comprising the steps of corotron charging to a surface potential of about +120 volts, exposing to activating radiation through a step-wedge and exposing for about 5 seconds to vapors of 1,1,1-trichloroethane in a chamber held at room temperature. The contrast density of the imaged migration imaging member measured with the densitometer described in Example I was determined to be about 1.2.

Other modifications of the present invention such as the use of a plurality of lower impingement rate zones will occur to those skilled in the art based upon a reading of the present disclosure. These are intended to be included within the scope of this invention.

We claim:

1. A process for depositing particles in a softenable layer to form a migration imaging member comprising heating at least the surface of said layer to soften said surface, contacting said surface in a first deposition zone at a high impingement rate with vapors comprising selenium or selenium alloy vapors from a selenium or selenium alloy source to form a sub-surface monolayer of spherical particles comprising said selenium or selenium alloys, removing said surface from said first deposition zone prior to substantial dropoff in optical density, contacting said surface in at least one second deposition zone longer than said first deposition zone at an impingement rate with said selenium or selenium alloy vapors of less than about one-half the impingement rate in said first deposition zone to increase the size of said spherical particles while maintaining a narrow size distribution of said spherical particles and achieving a high surface packing density thereby increasing the optical density of said migration imaging member, and removing said surface from said second deposition zone prior to substantial dropoff in optical density.

2. A process for depositing particles in a softenable layer according to claim 1 wherein said impingement rate in said first deposition zone is between about 0.1 and about 0.6 micrometer per second.

3. A process for depositing particles in a softenable layer according to claim 1 including contacting said surface in said first deposition zone at said high impingement rate with vapors comprising said selenium or selenium alloy vapors until said migration imaging member has a blue diffuse optical density of between about 1.5 and about 1.7.

4. A process for depositing particles in a softenable layer according to claim 1 including contacting said surface in said second deposition zone at said lower impingement rate with vapors comprising said selenium or selenium alloy vapors until said migration imaging member has a blue diffuse optical density of at least about 1.85 and a surface packing density of at least about 75 percent.

5. A process for depositing particles in a softenable layer according to claim 1 wherein the length of said second deposition zone is at least three times the length of said first deposition zone.

6. A process for depositing particles in a softenable layer according to claim 1 including maintaining a crucible supplying said selenium or selenium alloy vapors to said first deposition zone and said second deposition zone at a temperature between about 230° C. and about 375° C. and the background gas pressure below about $10^{-2}$ Torr.

7. A process for depositing particles in a softenable layer according to claim 1 including heating said softenable layer to reduce the viscosity of said surface to between about $10^3$ to about $10^9$ poises.

8. A process for depositing particles in a softenable layer according to claim 1 including directing said selenium or selenium alloy vapors through a slot in a mask interposed between said source for said selenium or selenium alloy vapors and said surface in said first deposition zone, said slot having a width which is narrower at the center of said slot than at the ends of said slot and directing a portion of said selenium or selenium alloy vapors from above and below said slot to said second deposition zone.

* * * * *